(12) United States Patent
Kim et al.

(10) Patent No.: US 9,865,845 B2
(45) Date of Patent: Jan. 9, 2018

(54) CASE FOR VEHICLE'S BATTERY PACK

(71) Applicant: LG CHEM, LTD., Seoul (KR)

(72) Inventors: Sung-Jong Kim, Daejeon (KR);
Chae-Yang Cho, Daejeon (KR);
Soon-Ho Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 311 days.

(21) Appl. No.: 14/421,670

(22) PCT Filed: Apr. 23, 2014

(86) PCT No.: PCT/KR2014/003568
§ 371 (c)(1),
(2) Date: Feb. 13, 2015

(87) PCT Pub. No.: WO2014/178569
PCT Pub. Date: Nov. 6, 2014

(65) Prior Publication Data
US 2015/0221911 A1    Aug. 6, 2015

(30) Foreign Application Priority Data

Apr. 29, 2013 (KR) .................. 10-2013-0047475
May 31, 2013 (KR) .................. 10-2013-0063092

(51) Int. Cl.
*H01M 2/10* (2006.01)
*H01M 2/06* (2006.01)
(Continued)

(52) U.S. Cl.
CPC .......... *H01M 2/0247* (2013.01); *H01M 2/06* (2013.01); *H01M 2/08* (2013.01); *H01M 2/1077* (2013.01);
(Continued)

(58) Field of Classification Search
CPC .... H01M 2/1077; H01M 2/0247; H01M 2/08; H01M 2/305; H01M 2/06; H01M 2/10;
(Continued)

(56) References Cited

U.S. PATENT DOCUMENTS 5,458,915 A    10/1995  Yamamoto
6,174,618 B1   1/2001   Nishiyama et al.
(Continued)

FOREIGN PATENT DOCUMENTS

CN    201708198 U    1/2011
CN    102195023 A    9/2011
(Continued)

OTHER PUBLICATIONS

International Search Report, issued in PCT/KR2014/003568, dated Aug. 28, 2014.
(Continued)

*Primary Examiner* — Karie O'Neill Apicella
(74) *Attorney, Agent, or Firm* — Birch, Stewart, Kolasch & Birch, LLP

(57) ABSTRACT

Disclosed is a case for a vehicle's battery pack. In an aspect of the present disclosure, it is possible to provide a stable and economic case for a battery pack including a plurality of secondary battery cells.

11 Claims, 6 Drawing Sheets

(51) Int. Cl.
*H01M 2/30* (2006.01)
*H01M 2/02* (2006.01)
*H01M 2/08* (2006.01)
*H01M 2/20* (2006.01)
*H01M 10/04* (2006.01)
*H01M 10/625* (2014.01)
*H01M 10/65* (2014.01)

(52) U.S. Cl.
CPC ........... *H01M 2/206* (2013.01); *H01M 2/305* (2013.01); *H01M 10/0422* (2013.01); *H01M 10/625* (2015.04); *H01M 10/65* (2015.04); *H01M 2220/20* (2013.01)

(58) Field of Classification Search
CPC ...... H01M 2/105; H01M 2/1055; H01M 2/30; H01M 2/02
See application file for complete search history.

(56) References Cited

U.S. PATENT DOCUMENTS

| | | | |
|---|---|---|---|
| 9,172,115 B2 * | 10/2015 | Kolden | H01M 10/425 |
| 2005/0079408 A1 | 4/2005 | Hirano | |
| 2007/0292723 A1 * | 12/2007 | Ikeda | H01M 2/105 |
| | | | 429/7 |
| 2009/0233163 A1 | 9/2009 | Fang et al. | |
| 2010/0015512 A1 | 1/2010 | Inoue et al. | |
| 2010/0092857 A1 * | 4/2010 | Phillips | H01M 4/244 |
| | | | 429/164 |
| 2012/0121967 A1 | 5/2012 | Nakamura et al. | |
| 2012/0231309 A1 | 9/2012 | Itoi et al. | |
| 2013/0002016 A1 | 1/2013 | Furukawa et al. | |
| 2013/0011710 A1 | 1/2013 | Naito et al. | |
| 2013/0011719 A1 | 1/2013 | Yasui et al. | |
| 2014/0106211 A1 * | 4/2014 | Lee | H01M 2/1077 |
| | | | 429/185 |

FOREIGN PATENT DOCUMENTS

| | | |
|---|---|---|
| CN | 102447081 A | 5/2012 |
| CN | 102468457 A | 5/2012 |
| CN | 102549803 A | 7/2012 |
| CN | 102859834 A | 1/2013 |
| CN | 203850370 U | 9/2014 |
| CN | 204011509 U | 12/2014 |
| JP | 2-24959 A | 1/1990 |
| JP | 6-64360 A | 3/1994 |
| JP | 11-111248 A | 4/1999 |
| JP | 2001-256940 A | 9/2001 |
| JP | 2003-162993 A | 6/2003 |
| JP | 2004-185867 A | 7/2004 |
| JP | 2007-95483 A | 4/2007 |
| JP | 3144501 U | 9/2008 |
| JP | 2008-270460 A | 11/2008 |
| JP | 2009-259752 A | 11/2009 |
| JP | 2011-49014 A | 3/2011 |
| JP | 2011-159597 A | 8/2011 |
| JP | 2011-181415 A | 9/2011 |
| JP | 2012-252924 A | 12/2012 |
| KR | 10-0876277 B1 | 12/2008 |
| WO | WO 2012/093452 | 7/2012 |
| WO | WO 2012/101981 | 8/2012 |

OTHER PUBLICATIONS

Written Opinion of the International Searching Authority, issued in PCT/KR2014/003568, dated Aug. 28, 2014.

* cited by examiner

CASE FOR VEHICLE'S BATTERY PACK

TECHNICAL FIELD

The present disclosure relates to a case for a battery pack, and more particularly, to a case for a vehicle's battery pack having a waterproof and drainage structure.

The present application claims priority to Korean Patent Application No. 10-2013-0047475 filed on Apr. 29, 2013 and Korean Patent Application No. 10-2013-0063092 filed on May 31, 2013 in the Republic of Korea, the disclosures of which are incorporated herein by reference.

DESCRIPTION OF THE RELATED ART

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, the secondary battery cells included in the battery pack should be firmly connected electrically and mechanically. Therefore, a stable and economic design is required for a case for a battery pack in order to ensure firm connection of secondary battery cells.

SUMMARY OF THE DISCLOSURE

The present disclosure is designed to solve the problems of the related art, and therefore the present disclosure is directed to providing a case for a vehicle's battery pack.

In one aspect of the present disclosure, there is provided a case for a battery pack, which includes a battery module assembly in which four battery modules, each having a plurality of cylindrical secondary battery cells (hereinafter, also referred to as 'cells'), are electrically connected in series, the case including: an upper pack case having a hole formed to expose an electrode post electrically connected to the battery module assembly; a lower pack case having a lower frame and a side frame; an electrode terminal configured to surround the exposed electrode post; a case sealing unit interposed between the lower pack case and the upper pack case to prevent external fluid from flowing in; and a terminal sealing unit interposed between the electrode terminal and the upper pack case to prevent fluid from flowing in from the outside, wherein a channel is formed at the lower frame in a region adjacent to the side frame, a battery module assembly support (hereinafter, also referred to as a 'support') having a step with a predetermined height from the lower frame is also formed at the lower frame.

According to an embodiment of the present disclosure, a drain may be formed at the support to pass through a center of the support and connect the facing channels.

According to an embodiment of the present disclosure, two drains may be formed at the support to pass through a center of the support and connect the facing channels, and the two drains may be crossed perpendicularly.

Preferably, the drain may have a slant so that the drain becomes higher as being closer to the center of the support.

According to an embodiment of the present disclosure, the upper pack case and the lower pack case may be made of polymer material. The polymer material may be polycarbonate, an acrylonitrile-butadiene-styrene resin, or a mixture of polycarbonate (PC) and acrylonitrile-butadiene-styrene resin (ABS), which does not contain a halogen element.

According to an embodiment of the present disclosure, the electrode terminal may be made of brass.

According to an embodiment of the present disclosure, the case sealing unit and the terminal sealing unit may be made of silicon material. At this time, the case sealing unit and the terminal sealing unit may be coupled to the upper pack case and the lower pack case by means of vibration fusing.

In an aspect of the present disclosure, it is possible to provide a stable and economic case for a battery pack including a plurality of secondary battery cells.

In another aspect of the present disclosure, it is possible to protect a plurality of secondary battery cells from fluid introduced from the outside.

In another aspect of the present disclosure, it is possible to guide fluid present in a case to a drain so as to be spatially separated from a battery module assembly included in a battery pack.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
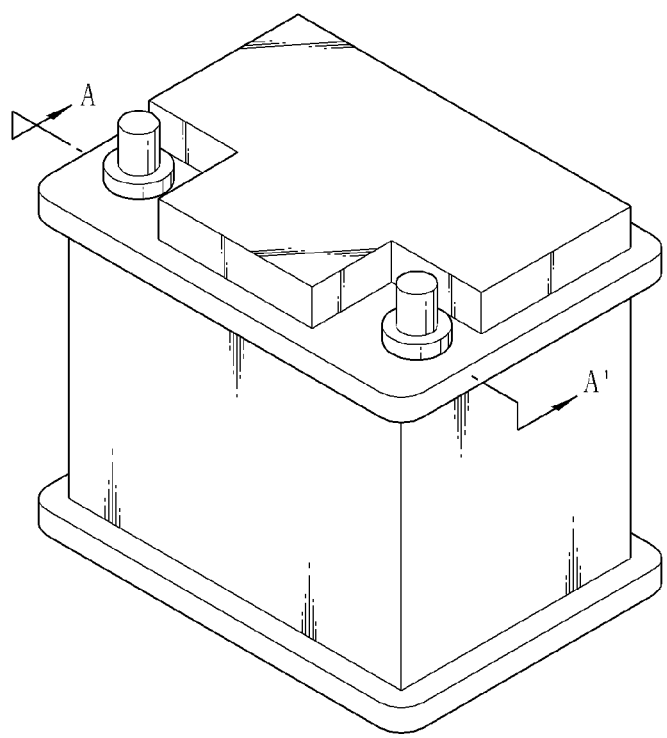
FIG. 1 is a perspective view showing a battery pack including a case according to an embodiment of the present disclosure.

FIG. 1 is a perspective view showing a battery pack 1 including a case 10, 70 for a battery pack (hereinafter, also referred to as a 'pack case') according to an embodiment of the present disclosure.

The battery pack 1 depicted in FIG. 1 is a vehicle's battery pack 1 which may be mounted to a vehicle, a hybrid electric vehicle (HEV), an electric vehicle (EV) or the like.

Preferably, the battery pack 1 may have a size according to the standards for vehicle's batteries. Therefore, the battery pack 1 may have a hexagonal shape as a whole.

Also preferably, the pack case 10, 70 may also have a size according to the standards for vehicle's batteries. However, the battery pack 1 and the pack case 10, 70 are not limited to the above sizes, and their lengths, widths and heights may be set in various ways.

Figure 2:
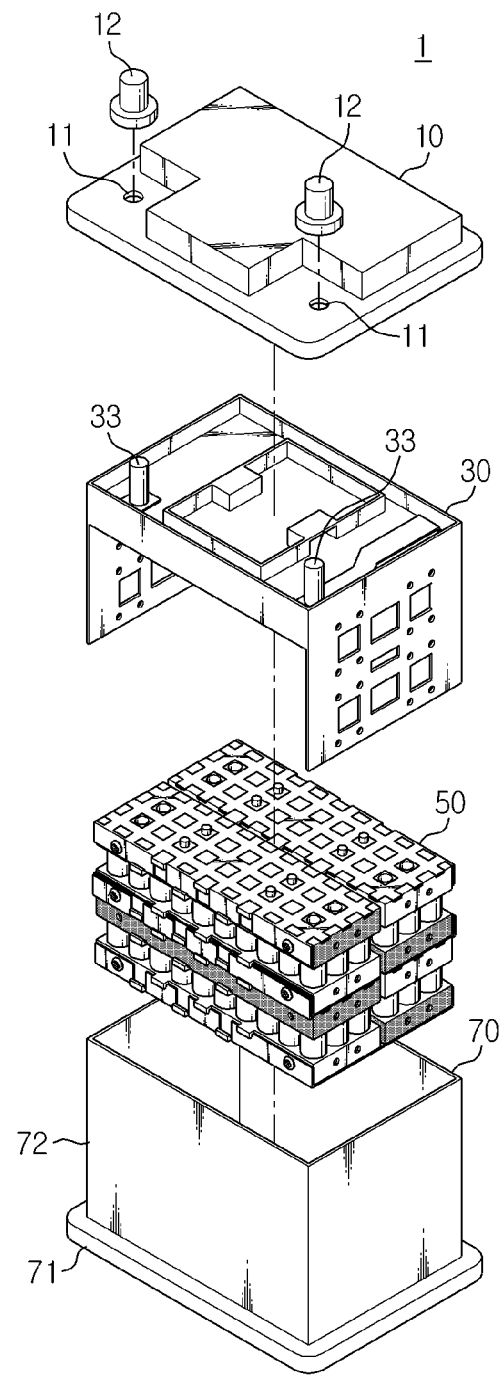
FIG. 2 is an exploded perspective view showing a battery pack including a case according to an embodiment of the present disclosure.

FIG. 2 is an exploded perspective view showing a battery pack 1 including a pack case 10, 70 according to an embodiment of the present disclosure.

The battery pack 1 according to an embodiment of the present disclosure may have an operating voltage of 12V when being used for a vehicle. In addition, a secondary battery cell 62 according to an embodiment of the present disclosure may have an operating voltage of 3V. Therefore, four battery modules 60 may be connected in series to configure a battery module assembly 50.

In addition, the battery module assembly 50 and an inner case 30 are included between an upper pack case 10 and a lower pack case 70 to configure the battery pack 1.

Hereinafter, the pack case 10, 70 included in the battery pack 1 will be described.

Referring to FIG. 2, the pack case 10, 70 according to an embodiment of the present disclosure includes an upper pack case 10 and a lower pack case 70.

The upper pack case 10 has a hole 11 formed to expose an electrode post 33 electrically connected to the battery module assembly. The exposed electrode post 33 is surrounded by an electrode terminal 12. According to an embodiment of the present disclosure, the electrode terminal 12 is made of brass.

The lower pack case 70 has a lower frame 71 and a side frame 72.

A case sealing unit 73 is interposed between the lower pack case 70 and the upper pack case 10 according to an embodiment of the present disclosure.

Figure 3:
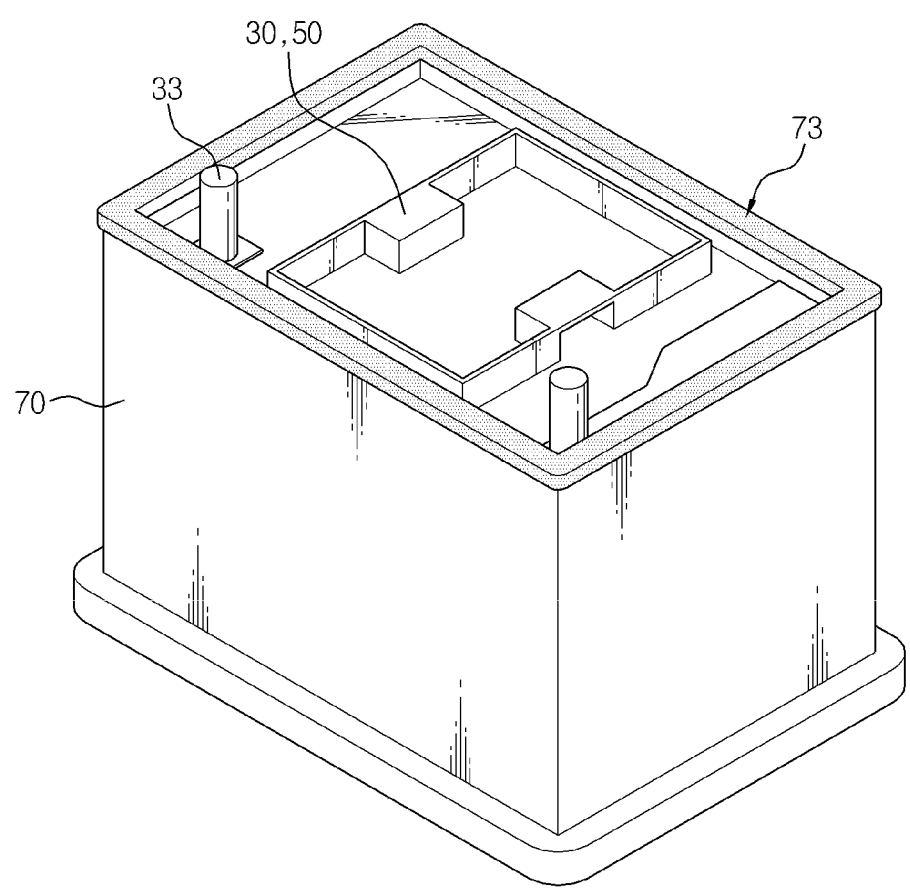
FIG. 3 is a perspective view showing a battery module assembly and an inner case mounted in a lower pack case according to an embodiment of the present disclosure.

FIG. 3 is a perspective view showing a battery module assembly 50 and an inner case 30 mounted in the lower pack case 70 according to an embodiment of the present disclosure.

A terminal sealing unit 13 is interposed between the electrode terminal 33 and the upper pack case 10 according to an embodiment of the present disclosure.

Figure 4:
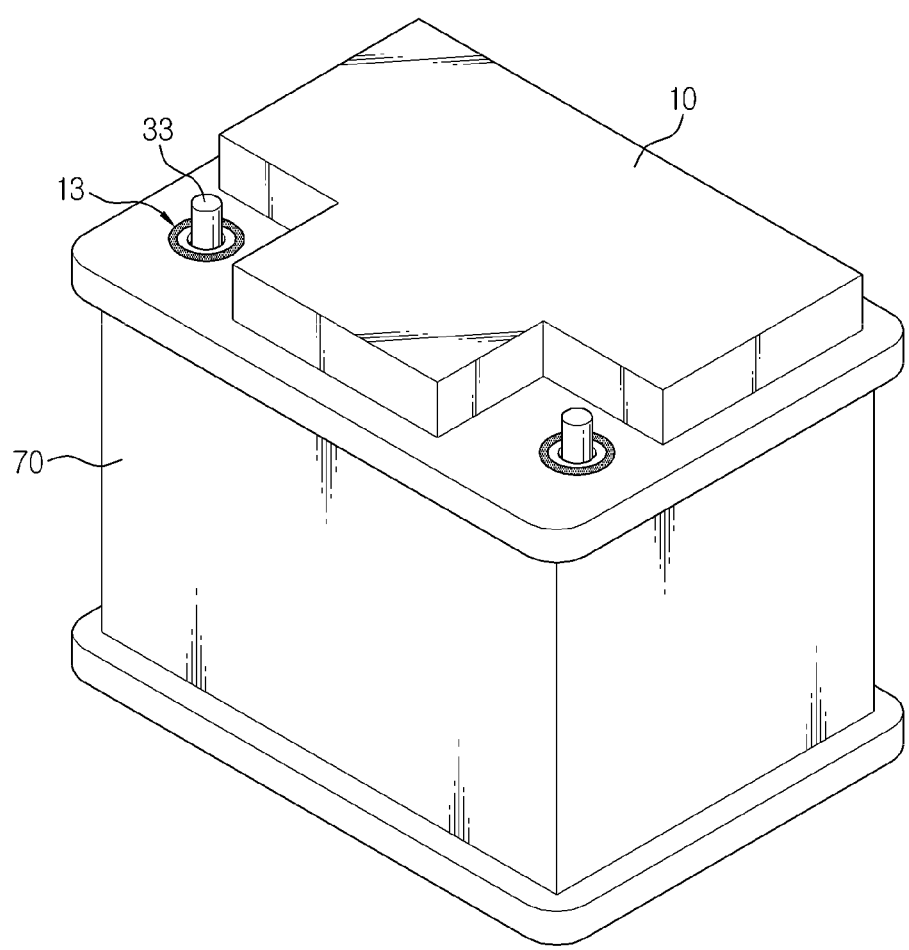
FIG. 4 is a perspective view showing an upper pack case mounted on the lower pack case according to an embodiment of the present disclosure.

FIG. 4 is a perspective view showing the upper pack case 10 mounted on the lower pack case 70 according to an embodiment of the present disclosure.

Referring to FIG. 4, it may be found that the terminal sealing unit 13 is interposed at the upper pack case 10 around the hole 11 so that the electrode post 33 is exposed outwards.

Figure 5:
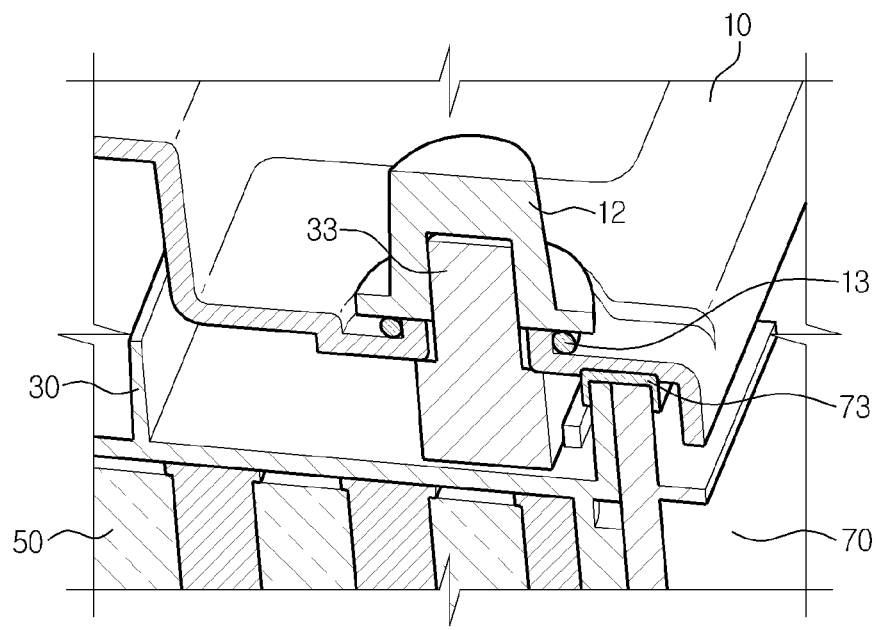
FIG. 5 is an enlarged view showing a section of the battery pack, taken along the line A-A' of FIG. 1.

FIG. 5 is an enlarged view showing a section of the battery pack 1, taken along the line A-A' of FIG. 1.

Referring to FIG. 5, it may be found a cross section for a contact portion of the upper pack case 10 and the lower pack case 70 according to an embodiment of the present disclosure.

Here, the case sealing unit 73 plays a role of preventing external fluid from flowing into the battery pack 1. In addition, the terminal sealing unit 13 plays a role of preventing external fluid from flowing into the battery pack 1 through the hole 11.

According to an embodiment of the present disclosure, the case sealing unit 73 and the terminal sealing unit 13 are made of silicon material. However, the case sealing unit 73 and the terminal sealing unit 13 are not limited to silicon material but may be made of any other material known in the art, which may prevent external fluid or moisture from flowing in.

According to an embodiment of the present disclosure, the case sealing unit 33 and the terminal sealing unit 13 are coupled to the upper pack case 10 and the lower pack case 70 by means of vibration fusing. However, the present disclosure is not limited to such coupling method.

Figure 6:
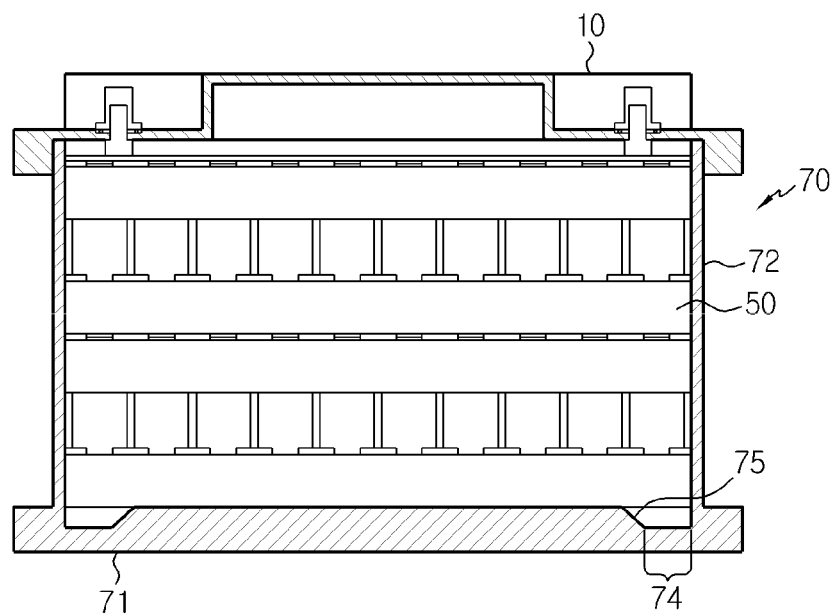
FIG. 6 is a cross-sectional view showing a lower frame of the battery pack, taken along the line A-A' of FIG. 1.

FIG. 6 is a cross-sectional view showing a lower frame 70 of the battery pack 1, taken along the line A-A' of FIG. 1.

Referring to FIG. 6, the lower frame 71 according to an embodiment of the present disclosure has a channel 74 formed in a region adjacent to the side frame 72. In addition, the lower frame 71 has a battery module assembly support 75 (hereinafter, also referred to as a 'support') having a step with a predetermined height from the lower frame 71.

The pack case according to an embodiment of the present disclosure prevents external fluid or moisture from penetrating, but there is still a possibility for a small amount of fluid or moisture to flow in. In addition, there is also a possibility that an electrolytic solution contained in the secondary battery cell leaks out. Therefore, it is needed to collect moisture or fluid present in the case to one side so that the battery module assembly 50 is not influenced by the moisture or fluid.

The support 75 has the step of a predetermined height, which may guide fluid or moisture to be collected to a lower portion. Therefore, fluid present in the battery pack 1 is collected at the channel 74. The channel 74 may be designed to have various widths, and the support 75 may also be designed to have various heights.

Figure 7:
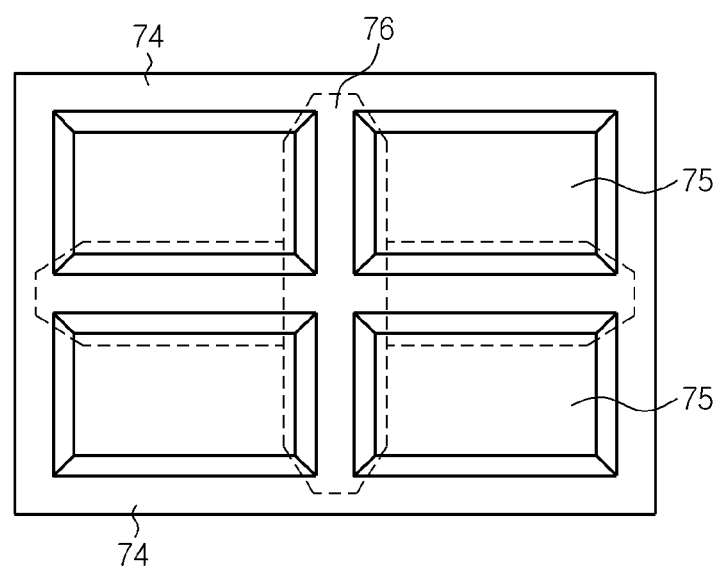
FIG. 7 is a plane view showing a lower case according to an embodiment of the present disclosure.

FIG. 7 is a plane view showing a lower case 70 according to an embodiment of the present disclosure.

Since FIG. 7 is a plane view of the lower case 70, an inside of the lower case 70, namely a top portion of the lower frame 71, is depicted.

According to an embodiment of the present disclosure, the support 75 has a drain 76 formed to pass through a center of the support 75 to connect the facing channels 74.

Preferably, two drains 76 may be formed at the support 75 to pass through the center of the support 75 to connect the facing channel s74, and the two drains 76 may be crossed perpendicularly.

Fluid such as an electrolytic solution leaking from the battery module assembly 50 does not always flow along the outer surface of the battery module assembly 50. For example, fluid such as an electrolytic solution may flow from the inside of the battery module assembly 50. Therefore, the drain 76 may be formed to pass through the center of the support 75 to guide the fluid to flow toward the channel 74. For this, the drain 76 may have a slant so that the drain 76 becomes higher as being closer to the center of the support 75.

According to an embodiment of the present disclosure, the upper pack case 10 and the lower pack case 70 are made of polymer material. The polymer material may be polycarbonate, an acrylonitrile-butadiene-styrene resin, or a mixture of polycarbonate (PC) and acrylonitrile-butadiene-styrene resin (ABS), which does not contain a halogen element.

According to the present disclosure, it is possible to provide a stable and economic pack case including a plurality of secondary battery cells. In addition, a plurality of secondary battery cells may be protected against fluid introduced from the outside. Further, fluid present at the inside may be guided to a drain so as to be spatially separated from a battery module assembly included in a battery pack.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A case for a battery pack, which includes a battery module assembly in which four battery modules, each having a plurality of cylindrical secondary battery cells, are electrically connected in series, the case comprising:
   an upper pack case having a hole formed to expose an electrode post electrically connected to the battery module assembly;
   a lower pack case having a lower frame and a side frame;
   an electrode terminal configured to surround the exposed electrode post;
   a case sealing unit interposed between the lower pack case and the upper pack case to prevent external fluid from flowing in; and
   a terminal sealing unit interposed between the electrode terminal and the upper pack case to prevent fluid from flowing in from the outside,
   wherein at least one channel is formed at an interior surface of the lower frame in a region adjacent to the side frame,
   wherein a battery module assembly support having a step with a predetermined height from the lower frame is formed at the lower frame and extends from the channel,
   wherein the at least one channel comprises at least two channels, and
   wherein at least one drain is formed at the battery module assembly support to pass through a center of the battery module assembly support and connect the channels.

2. The case for a battery pack according to claim 1, wherein the at least one drain has a slant so that the drain becomes higher as being closer to the center of the battery module assembly support.

3. The case for a battery pack according to claim 1, wherein the at least one drain comprises two drains are formed at the battery module assembly support to pass through a center of the battery module assembly support and connect the channels, and
wherein the two drains are crossed perpendicularly.

4. The case for a battery pack according to claim 3, wherein the two drains have a slant so that the drains become higher as being closer to the center of the battery module assembly support.

5. The case for a battery pack according to claim 1, wherein the upper pack case and the lower pack case are made of polymer material.

6. The case for a battery pack according to claim 5, wherein the polymer material is polycarbonate.

7. The case for a battery pack according to claim 5, wherein the polymer material is an acrylonitrile-butadiene-styrene resin.

8. The case for a battery pack according to claim 5, wherein the polymer material is a mixture of polycarbonate (PC) and acrylonitrile-butadiene-styrene resin (ABS), which does not contain a halogen element.

9. The case for a battery pack according to claim 1, wherein the electrode terminal is made of brass.

10. The case for a battery pack according to claim 1, wherein the case sealing unit and the terminal sealing unit are made of silicon material.

11. The case for a battery pack according to claim 10, wherein the case sealing unit and the terminal sealing unit are coupled to the upper pack case and the lower pack case by means of vibration fusing.

\* \* \* \* \*